(12) United States Patent
Yamamoto et al.

(10) Patent No.: US 10,682,874 B2
(45) Date of Patent: Jun. 16, 2020

(54) DROPLET DISPENSING APPARATUS

(71) Applicant: TOSHIBA TEC KABUSHIKI KAISHA, Tokyo (JP)

(72) Inventors: Hiroshi Yamamoto, Toda Saitama (JP); Shuhei Yokoyama, Mishima Shizuoka (JP); Takaya Kitawaki, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/712,311

(22) Filed: Dec. 12, 2019

(65) Prior Publication Data

US 2020/0114670 A1 Apr. 16, 2020

Related U.S. Application Data

(62) Division of application No. 16/274,994, filed on Feb. 13, 2019.

(30) Foreign Application Priority Data

Apr. 13, 2018 (JP) .................................. 2018-077785

(51) Int. Cl.
B41J 29/393 (2006.01)
(52) U.S. Cl.
CPC .................................. B41J 29/393 (2013.01)
(58) Field of Classification Search
CPC ...................................................... B41J 29/393
See application file for complete search history.

(56) References Cited

U.S. PATENT DOCUMENTS

| | | | |
|---|---|---|---|
| 9,821,552 | B2 | 11/2017 | Yokoyama et al. |
| 10,059,100 | B2 | 8/2018 | Yokoyama et al. |
| 2004/0151635 | A1 | 8/2004 | Leproust et al. |
| 2006/0144331 | A1 | 7/2006 | Hanafusa et al. |
| 2008/0211855 | A1 | 9/2008 | Kojima |

(Continued)

FOREIGN PATENT DOCUMENTS

| | | |
|---|---|---|
| EP | 2394745 A1 | 12/2011 |
| EP | 3222353 A1 | 9/2017 |
| JP | 2005-014216 A | 1/2005 |

OTHER PUBLICATIONS

IP.com search (Year: 2020).*

(Continued)

*Primary Examiner* — Lisa Solomon
(74) *Attorney, Agent, or Firm* — Kim & Stewart LLP

(57) ABSTRACT

A droplet dispensing apparatus includes a droplet ejection device, a microplate holder, a sheet stand, an image capturing device and a controller. The image capturing device is configured to move to a position above the sheet stand. The controller is configured to perform image processing on image data generated from an image captured by the image capturing device when the image capturing device is at the position above the test sheet on the sheet stand, to determine a size of each of test patterns formed by droplets dropped on the test sheet from the array of nozzles. The controller is further configured to generate a data file including the determined size of each of the test patterns. The test sheet colors or discolors at a place receiving a light-transmissive droplet.

6 Claims, 13 Drawing Sheets

(56) References Cited

U.S. PATENT DOCUMENTS

| | | | |
|---|---|---|---|
| 2012/0298036 A1* | 11/2012 | Ogawa | B41J 2/165 118/712 |
| 2017/0274689 A1 | 9/2017 | Rodriguez et al. | |
| 2018/0065361 A1 | 3/2018 | Yokoyama et al. | |
| 2018/0085745 A1 | 3/2018 | Yokoyama et al. | |
| 2018/0085746 A1 | 3/2018 | Yokoyama et al. | |
| 2018/0085757 A1 | 3/2018 | Yokoyama et al. | |
| 2018/0086077 A1 | 3/2018 | Yokoyama et al. | |
| 2018/0088142 A1 | 3/2018 | Yokoyama et al. | |
| 2018/0169649 A1 | 6/2018 | Yokoyama et al. | |
| 2018/0272333 A1 | 9/2018 | Higuchi et al. | |
| 2018/0272334 A1 | 9/2018 | Higuchi et al. | |
| 2018/0272335 A1 | 9/2018 | Higuchi et al. | |
| 2018/0272345 A1 | 9/2018 | Higuchi et al. | |
| 2019/0060933 A1 | 2/2019 | Yokoyama et al. | |
| 2019/0060934 A1 | 2/2019 | Yokoyama et al. | |
| 2019/0060935 A1 | 2/2019 | Yokoyama et al. | |
| 2019/0060936 A1 | 2/2019 | Yokoyama et al. | |
| 2019/0060937 A1 | 2/2019 | Yokoyama et al. | |
| 2019/0061342 A1 | 2/2019 | Yokoyama et al. | |
| 2019/0184390 A1 | 6/2019 | Yokoyama et al. | |
| 2019/0315122 A1 | 10/2019 | Yokoyama et al. | |

OTHER PUBLICATIONS

Heping Zhu et al. "A portable scanning system for evaluation of spray deposit distribution", Computers and Electronics in Agriculture, Elsevier, Amsterdam, NL, vol. 76, No. 1, Jan. 3, 2011, pp. 38-43.

Extended European Search Report dated Jun. 27, 2019, filed in counterpart European Patent Application No. 19162872.6, 10 pages.

* cited by examiner

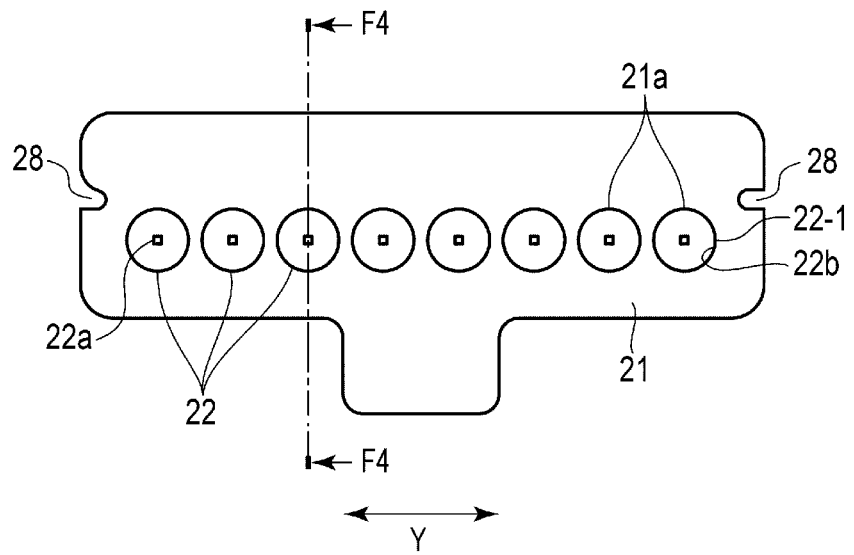
FIG. 2
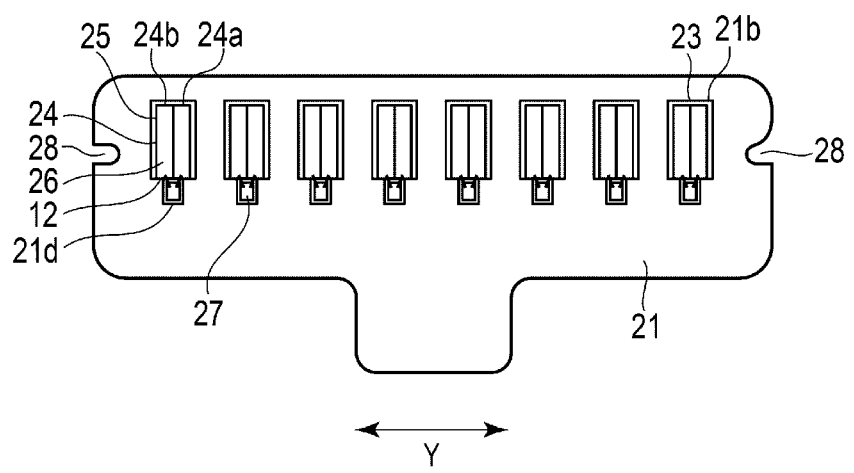
FIG. 3
FIG. 4
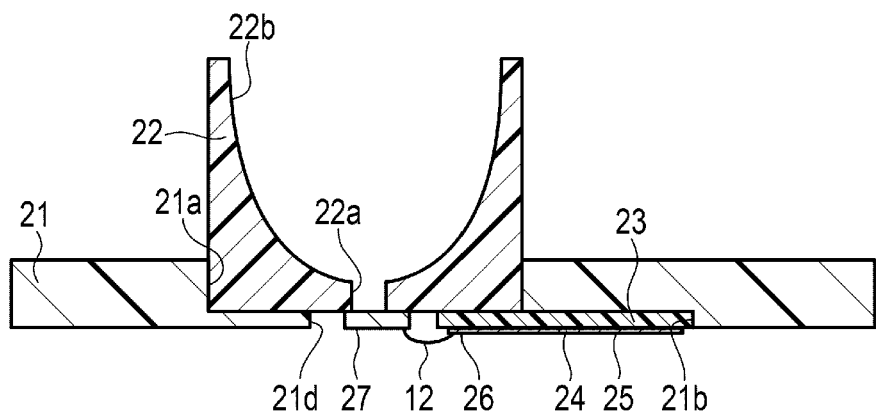

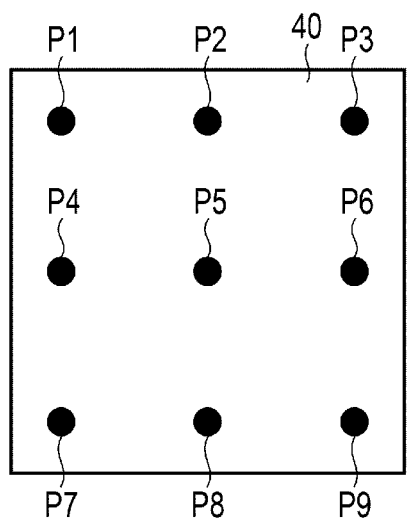

FIG. 10

| No. | D1 | D2 | D-Av |
|---|---|---|---|
| 1 | 40.414 | 40.261 | 40.337 |
| 2 | 38.764 | 40.010 | 39.387 |
| 3 | 41.537 | 41.510 | 41.524 |
| 4 | 38.363 | 40.302 | 39.332 |
| 5 | 40.231 | 38.391 | 39.311 |
| 6 | 38.583 | 40.374 | 39.478 |
| 7 | 41.617 | 38.933 | 40.275 |
| 8 | 40.831 | 40.183 | 40.507 |
| 9 | 40.667 | 39.858 | 40.763 |
| | | Av | 40.10 |
| | | $\sigma$ | 0.8 |

FIG. 11

| No. | C |
|---|---|
| 1 | 126.732 |
| 2 | 123.738 |
| 3 | 130.451 |
| 4 | 123.566 |
| 5 | 123.498 |
| 6 | 124.025 |
| 7 | 126.528 |
| 8 | 127.255 |
| 9 | 128.059 |
| Av | 125.98 |
| $\sigma$ | 2.4 |

DROPLET DISPENSING APPARATUS

CROSS-REFERENCE TO RELATED APPLICATIONS

This application is a division of U.S. patent application Ser. No. 16/274,994, filed on Feb. 13, 2019, which is based upon and claims the benefit of priority from Japanese Patent Application No. 2018-077785, filed on Apr. 13, 2018, the entire contents of each of which are incorporated herein by reference.

FIELD

Embodiments described herein relate generally to a droplet dispensing apparatus.

BACKGROUND

In the related art, there is a droplet dispensing apparatus using a microplate for dispensing fluids in picoliter (pL) to microliter (μL) amounts for biological or pharmaceutical R&D, medical diagnosis, medical inspection, or agricultural tests.

The droplet dispensing apparatus of one type includes a droplet ejection device configured to discharge a solution filled in the droplet ejection device. A droplet is then discharged from the droplet ejection device to the microplate. The droplet ejection device can be detachable from this type of droplet dispensing apparatus. The droplet ejection device is usually discarded after solution has been ejected and not re-filled with another solution after a single use in order to prevent contamination in later dispensing.

A clear, transparent solution is often dispensed in biological or pharmaceutical R&D. Representative solvents for the solution include water, phosphate buffered saline, glycerin aqueous solution, dimethylsulfoxide, and the like, each of which is a substantially colorless, transparent (clear) solution. Materials for evaluation or test are dissolved in any of these solvents. The dissolved material sometimes imparts a color to the solution though in general the solution will remain substantially transparent since the amount dissolved in the solvent is small.

DESCRIPTION OF THE DRAWINGS

FIG. 2 illustrates a plan view of an upper surface of a droplet ejection device.

FIG. 3 illustrates a plan view of a lower surface of the droplet ejection device.

FIG. 4 illustrates a cross-sectional view of the droplet ejection device taken along a line F4-F4 in FIG. 2.

FIG. 8 illustrates a test pattern formed on a test paper by a solution dispensed from the droplet ejection device.

FIG. 9 illustrates an output file including area data of the test patterns according to the first embodiment.

FIG. 10 illustrates an output file including diameter data of the test patterns.

FIG. 11 illustrates an output file including circumference data of the test patterns.

DETAILED DESCRIPTION

Figure 1:
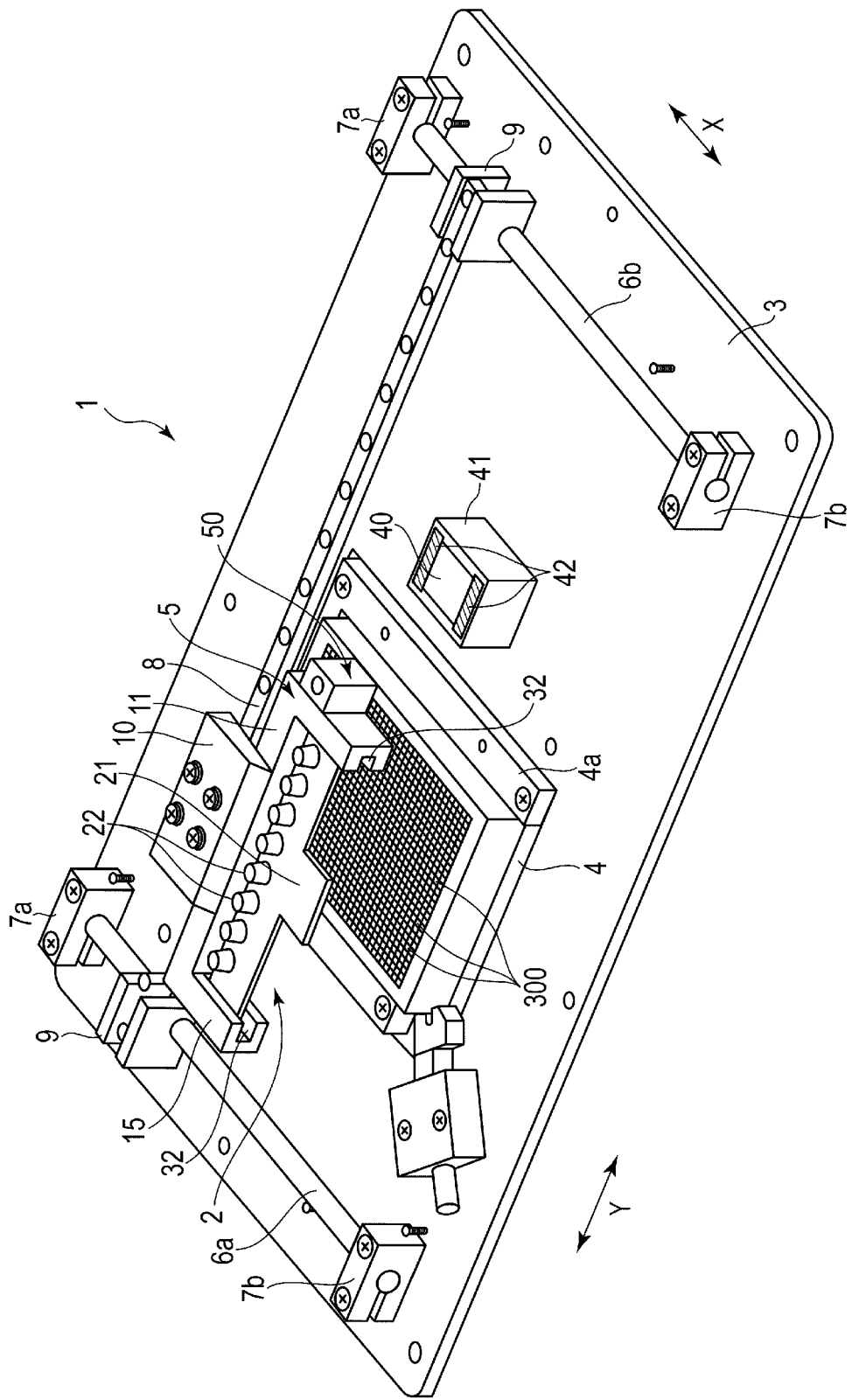
FIG. 1 illustrates a perspective view of a droplet dispensing apparatus according to a first embodiment.

Calibration for each dispensed solution is often required to confirm the accuracy of the dispensed amount of the solution to the microplate. Several methods for performing calibration are possible. In one calibration method, one or more droplets are ejected from each nozzle in a plurality of nozzles of the droplet ejection device on to a plate-like or sheet-like test object such as a glass substrate, a metal plate, a resin sheet, a transparent film, paper or the like. Accordingly, a circular test pattern, called a dot, is formed on a surface of the test object. The area, diameter or circumference (perimeter) of this test pattern is measured. Consequently, a discharge amount of a single droplet for each nozzle can be calculated based on a pre-prepared correlation table showing correlations between the discharge amount of the droplet and the area, diameter or other dimension of the dot.

However, the boundary line between the test pattern and the test object can be blurry and thus it cannot be easily recognized when a clear solution is dropped on the test object. Thus, in this method, and it is likely to be difficult to accurately measure the test pattern.

One or more of embodiments described herein are directed to providing a droplet dispensing apparatus for which the incorrect evaluation of test patterns can be prevented.

In general, according to an embodiment, a droplet dispensing apparatus includes a droplet ejection device, a microplate holder, a sheet stand, an image capturing device and a controller. The droplet ejection device has a solution holding vessel and an array of nozzles for ejection of droplets communicating with the solution holding vessel. The microplate holder is configured to hold a microplate into which the droplets are ejected. A test sheet for testing a droplet ejection property of the array of nozzles is placeable on the sheet stand. the test sheet has a receptive layer for receiving a droplet and becomes colored or discolored at a place where a light-transmissive droplet is received. The droplet ejection device is configured to horizontally move to a first position above the microplate holder and to a second position above the sheet stand. The image capturing device is configured to move to a position above the sheet stand. The controller is configured to perform image processing on image data generated from an image captured by the image capturing device when the image capturing device is at the position above the test sheet on the sheet stand, to determine a size of each of test patterns formed by droplets dropped on the test sheet from the array of nozzles. The controller is further configured to generate a data file including the determined size of each of the test patterns.

Hereinafter, example embodiments will be described with reference to the drawings. Each of drawings illustrates a schematic view for better understanding of an example embodiment. Shapes, dimensions, ratios, and the like in the drawings may be different from actual values, and can be changed or modified as appropriate.

First Embodiment

Figure 5:
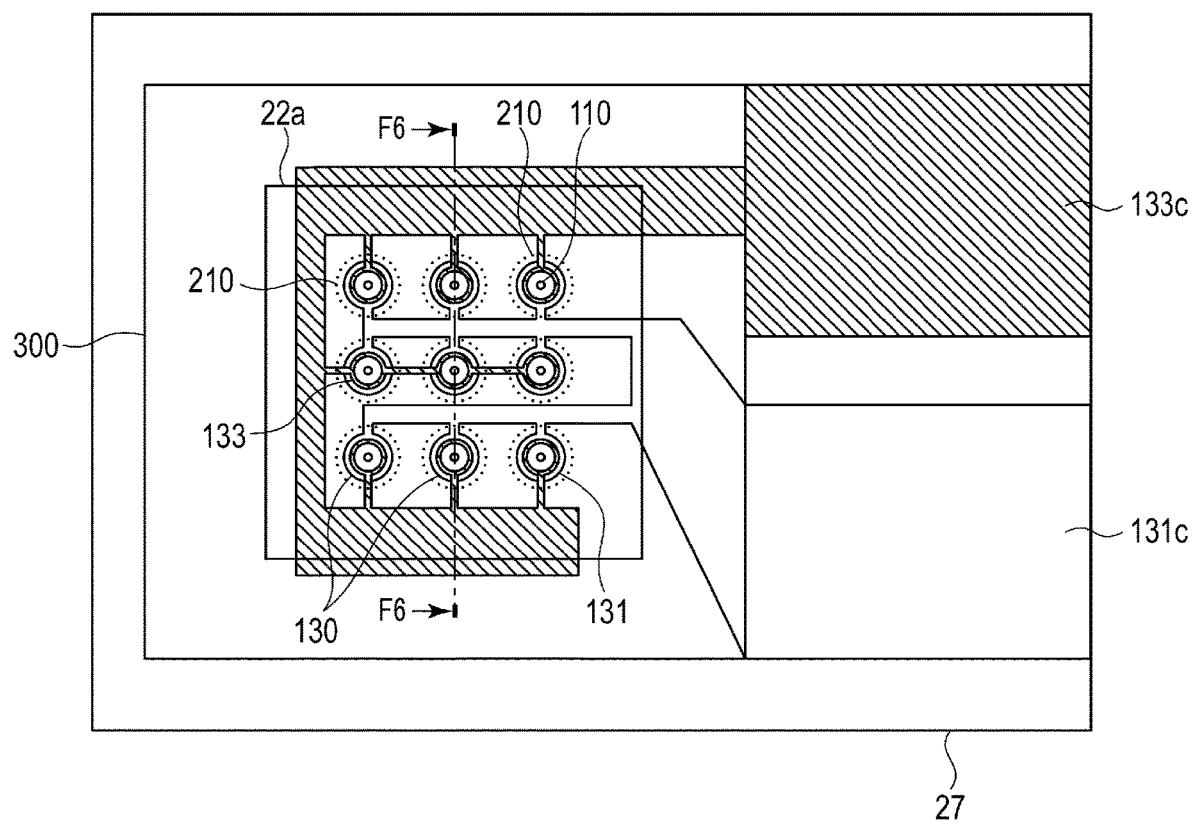
FIG. 5 illustrates a plan view of an upper surface of a solution discharging array of the droplet ejection device.
Figure 6:
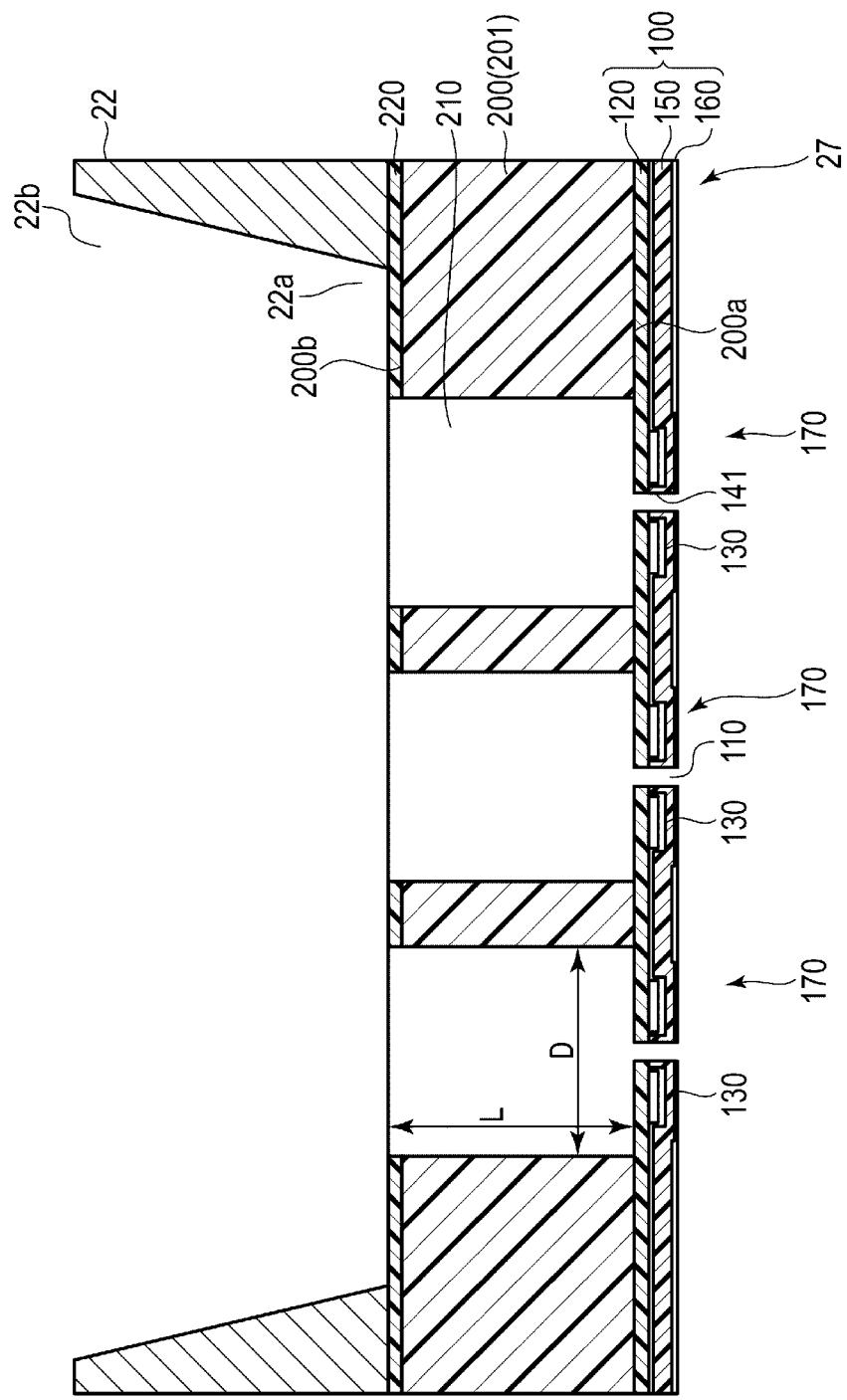
FIG. 6 illustrates a cross-sectional view of the solution discharging array taken along a line F6-F6 in FIG. 5.
Figure 7:
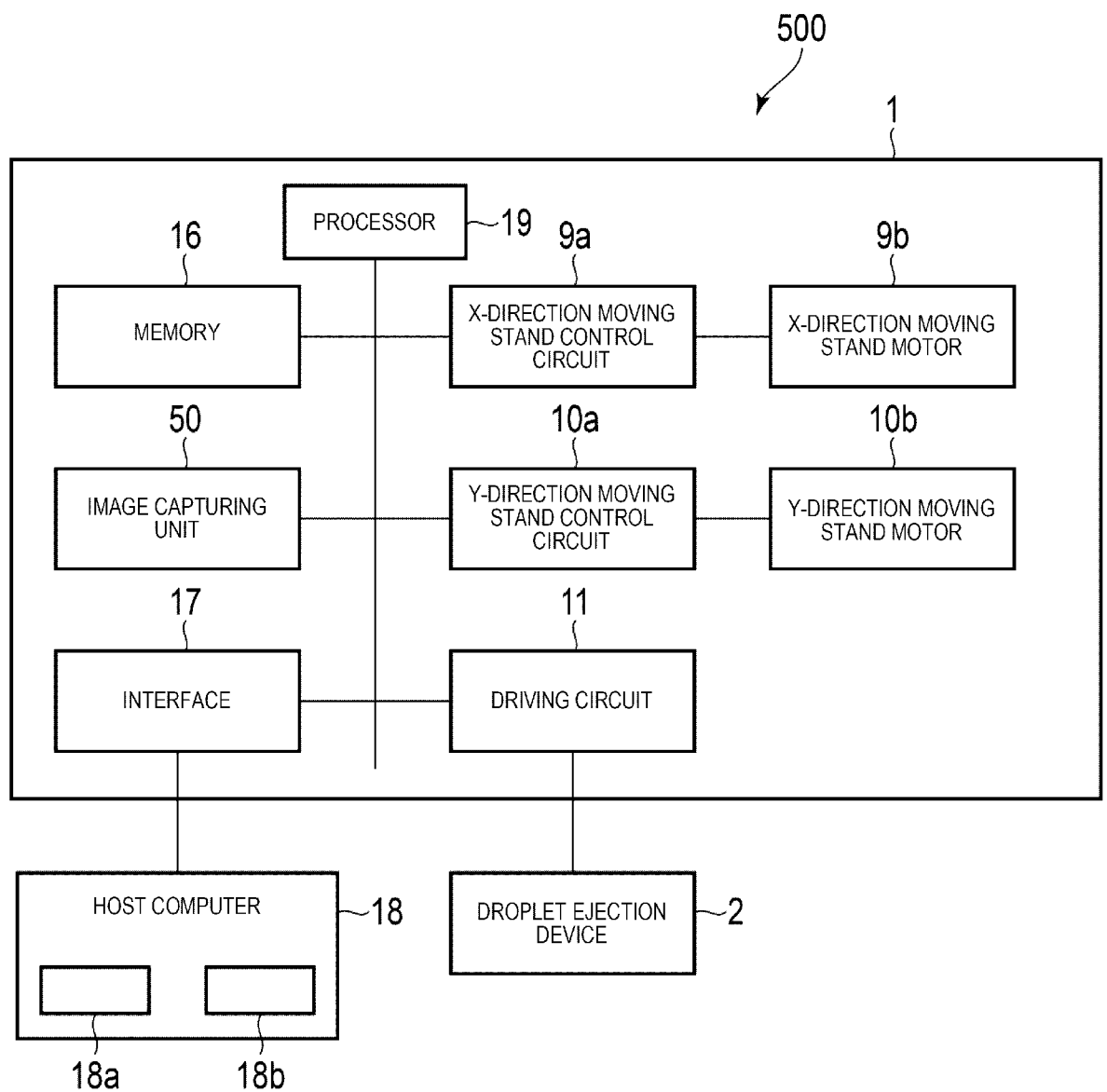
FIG. 7 is a block diagram illustrating a control system of a discharging system of the droplet ejection device.
Figure 12:
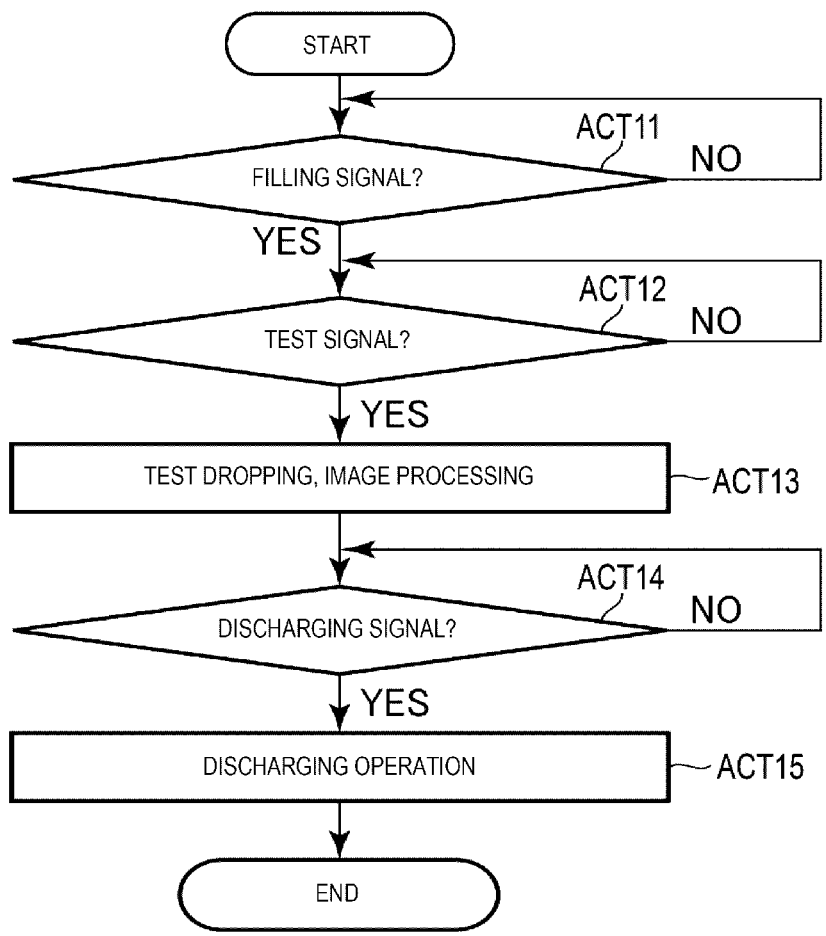
FIG. 12 is a flowchart illustrating operations of a droplet dispensing apparatus.

A droplet dispensing apparatus 1 according to a first embodiment will be described with reference to FIGS. 1 to 12. FIG. 1 illustrates a perspective view of the droplet dispensing apparatus. FIG. 2 illustrates a plan view of an upper surface of a droplet ejection device in the droplet dispensing apparatus. FIG. 3 illustrates a plan view of a lower surface, which is a surface from which a droplet is discharged, of the droplet ejection device. FIG. 4 illustrates a cross-sectional view of the droplet ejection device 2 taken along a line F4-F4 in FIG. 2. FIG. 5 illustrates a plan view of an upper surface of a solution discharging array of the droplet ejection device. FIG. 6 illustrates a cross-sectional view of the solution discharging array taken along a line F6-F6 in FIG. 5. FIG. 7 is a block diagram illustrating a control system of a discharging system of the droplet ejection device according to the first embodiment. FIG. 8 illustrates a test pattern formed on a test paper by a solution dropped from the droplet ejection device according to the first embodiment. FIG. 9 illustrates an output file for area data of the test patterns according to the first embodiment. FIG. 10 illustrates an output file for diameter data of the test patterns. FIG. 11 illustrates an output file for circumference data of the test patterns. FIG. 12 is a flowchart illustrating operations of the droplet dispensing apparatus according to the first embodiment.

The droplet dispensing apparatus 1 includes a rectangular plate-like base 3, a mounting module 5 on which the droplet ejection device 2 is mounted, a test paper placing stand 41, and an image capturing unit 50. In this embodiment, the solution is dropped into a 1536-well microplate 4. A longitudinal direction of the base 3 is referred to as X-direction, and a horizontal direction of the base 3 is referred to as Y-direction. X-direction is perpendicular to Y-direction. The microplate 4 and the test paper placing stand 41 configure a receiving section for receiving droplets discharged from the droplet ejection device 2.

The microplate 4 is fixed to the base 3. A frame-like attachment member 4a is provided on the base 3 to detachably attach the microplate 4 to the base 3. A pair of right and left X-direction guide rails 6a, 6b are, on the base 3, extended in X-direction and provided at both sides of the attachment member 4a of the microplate 4. Both ends of each of the X-direction guide rails 6a, 6b are fixed to fixing stands 7a, 7b, each of which protrudes from the base 3.

A Y-direction guide rail 8, extending in Y-direction, is provided between the X-direction guide rails 6a, 6b. Both ends of the Y-direction guide rail 8 are respectively fixed to X-direction moving stands 9 slidable in X-direction along the X-direction guide rails 6a, 6b.

The Y-direction guide rail 8 is provided with a Y-direction moving stand 10 movable in Y-direction along the Y-direction guide rail 8. The mounting module 5 is mounted on the Y-direction moving stand 10. The droplet ejection device 2 according to this embodiment is fixed to the mounting module 5. According to a movement in which the Y-direction moving stand 10 moves in Y-direction along the Y-direction guide rail 8, combined with a movement in which the X-direction moving stand 9 moves in X-direction along the X-direction guide rails 6a, 6b, the droplet ejection device 2 is movably supported at any position in X- and Y-directions perpendicular to each other.

Furthermore, the image capturing unit 50 is mounted on a part of a module body 15, which is an attachment section of the droplet ejection device 2, in the mounting module 5. Accordingly, the image capturing unit 50 is movably supported at any position in X- and Y-directions perpendicular to each other, together with the droplet ejection device 2.

The image capturing unit 50 adopts, for example, a small camera. The image capturing unit 50 captures a test pattern which is formed by a solution dropped from the droplet ejection device 2 on a test paper 40. The captured image data is sent to an external control PC or the like. The image capturing unit 50 may also be, for example, a small microscope equipped with a CCD camera and an adjustable zoom lens.

The droplet ejection device 2 according to the first embodiment includes a flat base member 21, which is a rectangular plate. A plurality of solution holding vessels 22 are arranged side by side in a row in Y-direction on a front side of the base member 21, as shown in FIG. 2. Eight solution holding vessels 22 are described in this embodiment, but the number of the solution holding vessels 22 is not limited to eight. The solution holding vessel 22 is a bottomed and cylindrical-shaped vessel of which an upper surface is open, as shown in FIG. 4. A first recessed portion 21a is formed on a front side of the base member 21 to attach the cylindrical-shaped vessel at a position corresponding to each of the solution holding vessels 22.

A bottom portion of the solution holding vessel 22 is adhesively fixed to the first recessed portion 21a. Furthermore, an opening 22a serving as a solution outlet is formed at a center position on the bottom portion of the solution holding vessel 22. The opening area of an upper opening 22b opened on an upper surface of the solution holding vessel 22 is larger than the opening area of the opening 22a as the solution outlet.

Notches 28 are engaging recesses for mounting and fixing the base member 21 to the mounting module 5 are respectively formed at both ends of the base member 21. The two notches 28 are formed in a semi-oval notch shape. Each notch 28 may be formed in a semi-circular shape, a semi-elliptical shape, or a triangular shape. Two notches 28 have different shapes in this embodiment. Accordingly, the base member 21 has different shapes on right and left sides, thus the orientation of the base member 21 can be easily recognized.

The same number of electrical boards 23 as the solution holding vessels 22 are arranged side by side in a row in Y-direction on a rear side of the base member 21, as shown in FIG. 3. The electrical board 23 is a rectangular flat plate member. A second recessed portion 21b, which is a rectangular recess for mounting the electrical board 23, and a solution discharging array opening 21d communicating with the second recessed portion 21b are formed on the rear side of the base member 21, as shown in FIG. 4. A proximal end portion of the second recessed portion 21b extends to the vicinity of an upper end of the base member 21 in FIG. 3 (corresponding to a position near a right end in FIG. 4). A distal end portion of the second recessed portion 21b extends to a position overlapped with a part of the solution holding vessel 22, as shown in FIG. 4. The electrical board 23 is adhered and fixed to the second recessed portion 21b.

The electrical board 23 includes an electrical board wiring 24 patterned and formed on a surface opposite to a surface where the electrical board 23 is adhered and fixed to the second recessed portion 21b. Two wiring patterns 24a, 24b are formed in the electrical board wiring 24, and respectively connected to a terminal portion 131c (see FIG. 5) of a lower electrode 131 and a terminal portion 133c (see FIG. 5) of an upper electrode 133.

A control signal input terminal 25 for inputting a control signal from the outside is formed at one end of the electrical board wiring 24. An electrode terminal connecting portion 26 is provided at the other end of the electrical board wiring 24. The electrode terminal connecting portion 26 is a connection portion for connecting with the lower electrode terminal portion 131c and the upper electrode terminal portion 133c, which are formed on a solution discharging array 27, as shown in FIG. 5.

Additionally, the base member 21 includes a through-hole of the opening 21d for mounting the solution discharging array opening 27. The opening 21d is a rectangular opening as shown in FIG. 3, which is formed at a position overlapping the recessed portion 21a on the rear side of the base member 21.

The solution discharging array 27 shown in FIG. 5 is adhered and fixed to a lower surface of the solution holding vessel 22 so as to cover the opening 22a of the solution holding vessel 22. The solution discharging array 27 is arranged at a position corresponding to the opening 21d of the base member 21.

The solution discharging array 27 is formed by laminating a nozzle plate 100 and a pressure chamber structure 200, as shown in FIG. 6. The nozzle plate 100 includes a plurality of nozzles 110 for discharging a solution, a diaphragm 120, a driving element 130 as a driving unit, a protective film 150 as a protective layer, and a fluid repellent film 160. An actuator 170 includes a diaphragm 120 and the driving element 130. The plurality of nozzles 110 are arranged in, for example, 3×3 columns. The plurality of nozzles 110 are disposed inside the opening 22a of the solution holding vessel 22 in this embodiment. A nozzle cluster is formed by these nozzles 110.

The diaphragm 120 is formed integrally with, for example, the pressure chamber structure 200. A silicon wafer 201 for manufacturing the pressure chamber structure 200 is heated in an oxygen atmosphere, and then an $SiO_2$ (silicon dioxide) film is formed by oxidation of a surface of the silicon wafer 201. The diaphragm 120 is formed of the $SiO_2$ film formed on the surface of the silicon wafer 201 by heating the silicon wafer 201 in the oxygen atmosphere. The diaphragm 120 may be formed by forming the $SiO_2$ film on the surface of the silicon wafer 201 with a chemical vapor deposition (CVD) method. A film thickness of the diaphragm 120 is preferably in the range of 1 to 30 μm.

The driving element 130 is formed in each nozzle 110. The driving element 130 has an annular shape surrounding the nozzle 110. However, the shape of the driving element 130 is not limited thereto, and may be a C-shape formed by cutting out a part of the annular shape.

The driving element 130 is electrically connected to the electrode terminal connecting portion 26 by a wire wiring 12. That is, the lower electrode terminal portion 131c is electrically connected to the wiring pattern 24a on one surface of the driving element 130. The upper electrode terminal portion 133c is electrically connected to the wiring pattern 24b on the other surface of the driving element 130. Alternatively, a flexible cable may be used. That is, an electrode pad of the flexible cable is electrically connected to the electrode terminal connecting portion 26, or to the terminal portions 131c, 133c, by thermocompression bonding using an anisotropic conductive film.

The driving element 130 receives a differential voltage between a voltage applied to the wiring pattern 24a and a voltage applied to the wiring pattern 24b. The driving element 130 is driven by the differential voltage.

The driving element 130 consists of a piezoelectric film as a piezoelectric material, with the lower electrode 131 and the upper electrode 133, which are formed on both surfaces of the piezoelectric film. The piezoelectric film is made of PZT ($Pb(Zr,Ti)O_3$:lead zirconium titanate). The piezoelectric film provided in the driving element 130 may also be made of a piezoelectric material, for example, PTO ($PbTiO_3$: lead titanate), PMNT ($Pb(Mg_{1/3}Nb_{2/3})O_3$—$PbTiO_3$) PZNT ($Pb(Zn_{1/3}Nb_{2/3})O_3$—$PbTiO_3$), KNN (a compound of $KNbO_3$ and $NaNbO_3$), ZnO, AlN, or the like.

The piezoelectric film provided in the driving element 130 generates polarization in a thickness direction. When an electric field in the same direction as the polarization is applied to the driving element 130, the driving element 130 expands and contracts in a direction perpendicular to an electric field direction. That is, the driving element 130 expands and contacts in a direction perpendicular to a film thickness.

The nozzle plate 100 includes the protective film 150. The protective film 150 includes a cylindrical solution passing portion 141 communicating with the nozzle 110 of the diaphragm 120. The nozzle plate 100 includes the fluid repellent film 160 covering the protective film 150. The fluid repellent film 160 is formed by spin-coating, for example, a silicone-based resin having a property of repelling a solution. The fluid repellent film 160 may also be formed of a material having a property of repelling a solution, such as a fluorine-containing resin.

The pressure chamber structure 200 includes a warp reduction film 220, which is a warp reduction layer, on a surface opposite to the diaphragm 120. The pressure chamber structure 200 includes a pressure chamber 210 that penetrates the warp reduction film 220 to reach a position of the diaphragm 120 and communicates with the nozzle 110. The pressure chamber 210 is formed, for example, in a circular shape coaxially with the nozzle 110.

The pressure chamber 210 has an opening communicating with the opening 22a of the solution holding vessel 22. It is preferable to set a size L in a depth direction larger than a size D in a width direction, in the opening of the pressure chamber 210. By setting the size L in the depth direction larger than the size D in the width direction, the pressure applied to the solution in the pressure chamber 210 by vibration of the diaphragm 120 of the nozzle plate 100 is delayed to release to the solution holding vessel 22.

A surface on which the diaphragm 120 of the pressure chamber 210 is arranged is referred to as a first surface 200a, and a surface on which the warp reduction film 220 is arranged is referred to as a second surface 200b, in the pressure chamber structure 200. The solution holding vessel 22 is adhered to the side of the warp reduction film 220 of the pressure chamber structure 200 by, for example, an epoxy adhesive. The pressure chamber 210 of the pressure chamber structure 200 communicates with the opening 22a of the solution holding vessel 22 through an opening on the side of the warp reduction film 220. The opening area of the opening 22a of the solution holding vessel 22 is larger than the opening area of the opening communicating with the opening 22a of the solution holding vessel 22 of all pressure chambers 210 formed on the solution discharging array 27. Therefore, all pressure chambers 210 formed on the solution discharging array 27 communicate with the opening 22a of the solution holding vessel 22.

The diaphragm 120 is deformed in a thickness direction by the operation of the planar driving element 130. The droplet ejection device 2 discharges the solution filled up to the nozzle 110 by the pressure change in the pressure chamber 210 of the pressure chamber structure 200 caused by the deformation of the diaphragm 120.

The test paper placing stand 41 shown in FIG. 1 is a table on which the test paper 40 is placed. The test paper placing stand 41 is disposed in a movable region of the droplet ejection device 2 on the base 3. On the test paper 40, the test pattern p is formed by the solution dropped from the droplet ejection device 2 for calibrating the solution filled in the nine nozzles 110 of the droplet ejection device 2.

The test paper 40 has a receptive layer, and is colored or discolored at a place where a light-transmissive droplet is received. A water sensitive testing paper from Spraying Systems Co. is used as the test paper 40 in an example. The test paper 40 is light yellow in the normal state (when not yet inspected), but changes to dark blue at a place at which the fluid contacts. The test paper 40 also changes to dark blue at a place where the droplet is dispensed when the organic solvent dimethylsulfoxide is dispensed instead of an aqueous solution such as water, phosphate buffered saline, or glycerin aqueous solution. The solution on the test paper 40 keeps a substantially dome (hemispherical) shape. Even after the solution volatilizes, the dark blue discolored pattern on the test paper 40 remains.

In this embodiment, the test pattern p is formed on the test paper 40 by dispensing one or more droplets to the test paper 40 from each of the nine nozzles 110 of the solution discharging array 27 connected to the solution holding vessel 22 in dropwise operation of the droplet ejection device 2. FIG. 8 shows a test pattern p formed on the test paper 40.

The test paper placing stand 41 includes test paper holding members 42 for holding the test paper 40 on the test paper placing stand 41, as shown in FIG. 1. In some examples, rectangular paperweights may be employed as test paper holding members 42. The test paper holding members 42 may be clips formed on the test paper placing stand 41, or any other structure so long as the function of securing and holding the test paper is provided.

It is preferable that the height of the test paper placing stand 41 is substantially the same as the height of an upper surface of the microplate 4 on which a well opening 300 of the microplate 4 is disposed. In this case, it is unnecessary to change from the height at which the droplet ejection device 2 drops the solution droplets into the well opening 300 of the microplate 4 to the height at which the droplet ejection device 2 drops the solution droplets onto the test paper 40 on the test paper placing stand 41, and vice versa.

A control system of a discharging system 500 of the droplet ejection device 2 will be described below. FIG. 7 is a block diagram illustrating the control system of the discharging system 500. The discharging system 500 of this embodiment includes the droplet dispensing apparatus 1, the droplet ejection device 2, a host computer 18 and the like.

The host computer 18 controls the droplet dispensing apparatus 1 in accordance with an operation from an operator. The host computer 18 includes an operation unit 18a, a display unit 18b and the like. Furthermore, the host computer 18 consists of a processor, RAM, ROM, NVM and the like.

The operation unit 18a receives an input operation by the operator. The operation unit 18a is, for example, a keyboard, a mount, a touchscreen or the like.

The display unit 18b displays various kinds of information under the control of the processor 19, which functions as a controller of the droplet dispensing apparatus 1. The display unit 18b includes, for example, a liquid crystal monitor. When the operation unit 18a includes the touchscreen or the like, the display unit 18b may be integrally formed with the operation unit 18a.

The host computer 18 receives various operations of the operator via the operation unit 18a. For example, the host computer 18 receives an operation of the operator indicating that the solution holding vessel 22 is filled with the solution. Furthermore, the host computer 18 receives an operation of the operator issuing an instruction to discharge the solution from the solution holding vessel 22.

When the host computer 18 receives an operation for discharging the solution from the solution holding vessel 22, the host computer 18 transmits a signal to discharge the solution to the droplet dispensing apparatus 1. The host computer 18 may receive an operation of instruction for each solution holding vessel 22. For example, the host computer 18 may receive the operation indicating that the solution holding vessel 22 is filled with the solution or the operation issuing an instruction to discharge the solution from the solution holding vessel 22 for each solution holding vessel 22.

The droplet dispensing apparatus 1 includes an X-direction moving stand control circuit 9a, an X-direction moving stand motor 9b, a Y-direction moving stand control circuit 10a, a Y-direction moving stand motor 10b, a driving circuit 11, a processor 19, a memory 16, an interface 17, an image capturing unit 50 and the like, as shown in FIG. 7. These units are connected to each other via a data bus. The droplet dispensing apparatus 1 may have an additional configuration if required or may exclude a specific configuration, in addition to or from the configuration as shown in FIG. 7.

The processor 19 has a function of controlling the overall operation of the droplet dispensing apparatus 1. The processor 19 may include an internal cache, various interfaces and the like. The processor 19 implements various processes by executing programs stored in advance in the internal cache, the memory 16 and the like.

Furthermore, a part of various functions implemented by the processor 19 executing the programs may be implemented by a hardware circuit. In this case, the processor 19 controls the functions executed by the hardware circuit.

The memory 16 stores various kinds of data. For example, the memory 16 stores a control program, control data and the like. The control program and the control data are stored in advance depending on a specification of the droplet dispensing apparatus 1. The control program is, for example, a program that supports the functions implemented by the droplet dispensing apparatus 1.

The memory 16 temporarily stores, for example, data being processed by the processor 19. Additionally, the memory 16 may store data required for executing an application program, execution results of the application program and the like.

The interface 17 is an interface for transmitting and receiving data to and from the host computer 18. For example, the interface 17 is connected to the host computer 18 via a wired or wireless line. For example, the interface 17 may support a LAN connection, a USB connection or a Bluetooth® connection.

The X-direction moving stand control circuit 9a drives the X-direction moving stand motor 9b based on a signal from the processor 19. The X-direction moving stand control circuit 9a supplies a signal or electric power to the X-direction moving stand motor 9b to drive the X-direction moving stand motor 9b.

The X-direction moving stand motor 9b moves the X-direction moving stand 9 in X-direction. For example, the X-direction moving stand motor 9b is connected to the X-direction moving stand 9 via a gear or the like and moves the X-direction moving stand 9 in X-direction.

The Y-direction moving stand control circuit 10a drives the Y-direction moving stand motor 10b based on a signal from the processor 19. The Y-direction moving stand control circuit 10a supplies a signal or electric power to the Y-direction moving stand motor 10b to drive the Y-direction moving stand motor 10b.

The Y-direction moving stand motor 10b moves the Y-direction moving stand 10 in Y-direction. For example, the Y-direction moving stand motor 10b is connected to the Y-direction moving stand 10 via a gear or the like and moves the Y-direction moving stand 10 in Y-direction.

Functions implemented by the processor 19 of the droplet dispensing apparatus 1 will be described below. The following functions are implemented by the processor 19 executing a program stored in the memory 16 or the like.

First, the processor 19 has a function of determining that the solution holding vessel 22 is filled with the solution. For example, the operator inputs an operation indicating that the solution is completely filled in the solution holding vessel 22 to the operation unit 18a of the host computer 18. The operator may input an operation indicating that the specific solution holding vessel 22 is completely filled with the solution.

The host computer 18 receives the operation indicating the solution is completely filled, and then transmits a filling signal indicating that the solution is completely filled to the droplet dispensing apparatus 1. The filling signal may indicate that the specific solution holding vessel 22 has been completely filled with solution.

The processor 19 determines whether or not the filling signal has been received from the host computer 18 via the interface 17. The processor 19 determines that the solution holding vessel 22 has been filled with the solution when the filling signal is received from the host computer 18. For example, the operator supplies a predetermined amount of the solution to the solution holding vessel 22 via the upper opening 22b of the solution holding vessel 22 using a pipetter or the like. The solution is held inside the solution holding vessel 22. The opening 22a at the bottom of the solution holding vessel 22 communicates with the solution discharging array 27. The solution from solution holding vessel 22 is filled into each of the pressure chambers 210 of the solution discharging array 27 via the opening 22a on a bottom surface of the solution holding vessel 22.

The solution held in the droplet ejection device 2 contains any of, for example, low molecular compound, fluorescent reagent, protein, antibody, nucleic acid, plasma, bacteria, blood cell and cell. A main solvent, which here can be considered the substance with the largest weight ratio or volume ratio in the solution, is generally water, glycerin, or dimethylsulfoxide.

The solution can be, and is likely to be, a clear solution. A clear solution in this context is a solution without a color to an unaided eye. However, some solutes may have a fluorescence property under ultraviolet light and thus absorbs ultraviolet light and emit visible light. But since only a minute amount of such ultraviolet fluorescent solute is typically dissolved in a clear solvent when preparing a solution to be dispensed, such a solution including such a solute in minute amount is also considered as a clear solution.

The droplet dispensing apparatus 1 or the droplet ejection device 2 may include a sensor for detecting a state where the solution holding vessel 22 is filled with the solution. The processor 19 may determine that the solution holding vessel 22 is filled with the solution using the sensor. A method for detecting the state of the solution in the solution holding vessel 22 by the processor 19 is not limited to a specific method.

Moreover, the processor 19 causes droplets for forming the test pattern p to be dispensed on the test paper 40 after the solution holding vessel 22 is filled with the solution, and performs image processing on the formed test pattern p.

The operator performs an input operation instructing to form the test pattern p and an operation instructing to measure an area of the test pattern p, using the operation unit 18a of the host computer 18. At this time, the operator may perform an input operation instructing to form the test pattern p and measure an area of the test pattern p, for the specific solution holding vessel 22.

The host computer 18 receives the instruction to form the test pattern p and the instruction to measure the area of the test pattern p, and then transmits to the droplet dispensing apparatus 1 a test signal instructing formation of the test pattern p and measuring of the area of the test pattern p. The test signal may instruct formation of the test pattern p and measuring the area of the test pattern p for a specific solution holding vessel 22.

The processor 19 receives the test signal via the interface 17. The processor 19 causes the droplet ejection device 2 to discharge the solution based on the test signal. The processor 19 controls the X-direction moving stand motor 9b and the Y-direction moving stand motor 10b to move the droplet ejection device 2 set on the mounting module 5 to a predetermined position on the test paper 40 held on the test paper placing stand 41.

When the droplet ejection device 2 is moved to the predetermined position, the processor 19 causes a voltage for discharging the solution to be applied to the driving element 130 using the driving circuit 11. At this time, the processor 19 transmits a signal to the driving circuit 11, and a voltage control signal is input from the driving circuit 11 to the control signal input terminal 25 of the electrical board wiring 24. The voltage control signal is input to the driving element 130 from the electrode terminal connecting portion 26 of the electrical board wiring 24. The driving element 130 deforms the diaphragm 120 in response to the application of the voltage control signal, thereby changing a volume of the pressure chamber 210. Accordingly, the solution is discharged as solution droplets from the nozzle 110 of the solution discharging array 27.

An amount of single droplet discharged from the nozzle 110 is 2 to 5 pL. Therefore, it is possible to control fluid dispensing on the order of pL to μL by controlling the number of drops. In this embodiment, one or more droplets are dispensed onto the test paper 40 from each of the nine nozzles 110 of the solution discharging array 27, so that nine dark blue dots, which are regions discolored by the attached solution, are formed as the test patterns p1 to p9 (see FIG. 8).

The processor 19 controls the X-direction moving stand motor 9b and the Y-direction moving stand motor 10b to move the image capturing unit 50 of the mounting module 5 to a position opposite to the test paper 40 after the test pattern p is formed. The processor 19 causes the image capturing unit 50 to capture the test patterns p1 to p9 of nine dots formed on the test paper 40 after moving the image capturing unit 50. At this time, the processor 19 acquires image data of the test pattern p captured by the image capturing unit 50, thereby binarizing the image data and calculating the area of the test pattern p. Subsequently, the processor 19 transmits the image data of the test pattern p to the host computer 18 via the interface 17.

The host computer 18 receives the signal and displays the image data of the test pattern p and an output file of the area of the test pattern p on the display unit 18b or the like. FIG. 8 illustrates a test pattern formed on the test paper and captured by the image capturing unit 50. FIG. 9 conceptually illustrates an output file for the area S of the test pattern p.

A first line is a title, which includes columns respectively representing a nozzle number and a dot area S [in µm²] corresponding to the nozzle number from the leftmost in the output file shown in FIG. 9. Second to tenth lines show data representing the dot area S of each of the nine nozzles 110. Eleventh line shows data representing an average value Av of the dot areas S of the nine nozzles 110. Twelfth line shows data representing a standard deviation (σ) of the nine dot areas S.

A correlation table representing a correlation between a solution discharge amount and the dot area S is created in advance. The operator calibrates the solution using the data of the dot area S displayed on the display unit 18b and the correlation table created in advance. At this time, a discharge amount of the single droplet from each nozzle 110 of the solution discharging array 27, forming the pattern p, and a dispensed amount of the total solution ejected from the nine nozzles 110 in a single discharging operation are calculated.

A method of processing the captured image of the test pattern p for solution calibration is not limited to the calculation of the area S of the test pattern p. For example, a dot diameter or circumference of the test pattern p may be calculated. FIG. 10 conceptually illustrates an output file for a diameter D of the test pattern p. FIG. 11 conceptually illustrates an output file for a circumference C of the test pattern p.

A first line is a title, which includes columns respectively representing a nozzle number, a dot diameter (D1) [in µm] in X-direction corresponding to the nozzle number, a dot diameter (D2) [in µm] in Y-direction corresponding to the nozzle number, and an average value (AV) [in µm] of the dot diameters in X- and Y-directions from the leftmost, in the output file shown in FIG. 10. Second to tenth lines show data representing the dot diameters D1, D2 of each of the nine nozzles 110. Eleventh line shows data representing each average value D-AV of the dot diameters D1, D2 for the nine nozzles 110. Twelfth line shows data representing a standard deviation (σ) of the nine dot diameters D.

A first line is a title, which includes columns respectively representing a nozzle number, and a dot circumference (C) [in µm] corresponding to the nozzle number from the leftmost, in the output file shown in FIG. 11. Second to tenth lines show data representing the dot circumference C of each of the nine nozzles 110. Eleventh line shows data representing an average value (Av) of the dot circumferences C of the nine nozzles 110. Twelfth line shows data representing a standard deviation (σ) of the nine dot circumferences C.

A correlation table representing a correlation between a solution discharge amount and the dot diameter average value D-AV or the dot circumference C is created in advance. The operator calibrates the solution using the data of the dot diameter average value D-AV displayed on the display unit 18b and the correlation table between the solution discharge amount and the dot diameter average value D-AV, created in advance. Alternatively, the operator calibrates the solution using the data of the dot circumference C displayed on the display unit 18b and the correlation table between the solution discharge amount and the dot circumference C, created in advance. At this time, a discharge amount of the single droplet from each nozzle 110 of the solution discharging array 27, forming the pattern p, and a dispensed amount of the total solution ejected from the nine nozzles 110 in a single discharging operation are calculated.

Moreover, the processor 19 has a function of operation to discharge the solution from the droplet ejection device 2 to each well opening 300 of the microplate 4 after forming the test pattern p and transmitting the output file of the processed image date of the test pattern to the host computer 18.

The operator inputs to the operation unit 18a of the host computer 18 an instruction of an operation for discharging the solution to each well opening 300 of the microplate 4 after the solution calibration is completed. The operator may input an instruction to discharge the solution from the specific solution holding vessel 22.

The host computer 18 receives the instruction to discharge the solution, and then transmits a signal (discharging signal) instructing to discharge the solution to the droplet dispensing apparatus 1. The discharging signal may instruct to discharge the solution from the specific solution holding vessel 22.

The processor 19 receives the discharging signal via the interface 17. The processor 19 causes the droplet ejection device 2 to discharge the solution to each well opening 300 of the microplate 4 based on the discharging signal.

The processor 19 controls the X-direction moving stand motor 9b and the Y-direction moving stand motor 10b to move the droplet ejection device 2 set on the mounting module 5 to a predetermined position. For example, the processor 19 moves the droplet ejection device 2 to a position where the plurality of nozzles 110 are accommodated in the well opening 300. Furthermore, the processor 19 moves the droplet ejection device to the predetermined position in accordance with the discharging signal.

When the droplet ejection device 2 is moved to the predetermined position, the processor 19 causes a voltage for discharging the solution to be applied to the driving element 130 using the driving circuit 11. Accordingly, the solution is discharged as solution droplets from the nozzle 110 of the solution discharging array 27. Since the fluid is dropped in a predetermined amount into the well opening 300, the number of the discharging operations of the solution discharging array 27 is set based on a result of the solution calibration.

Since the fluid is dropped in a predetermined amount into the well opening 300, the processor 19 repeatedly transmits the signals to the X-direction moving stand control circuit 9a, the Y-direction moving stand control circuit 10a, and the driving circuit 11. The number of the discharging operations and the position at which the solution is discharged, set by the processor 19, are not limited to a specific configuration.

FIG. 12 is a flowchart illustrating example operations of the processor 19 of the droplet dispensing apparatus 1.

First, the processor 19 determines whether or not the filling signal has been received via the interface 17 (ACT 11). When the filling signal is not received via the interface 17 (ACT 11: NO), the process returns to ACT 11.

When the filling signal has been received via the interface 17 (ACT 11: YES), the processor 19 determines whether or not the test signal has been received via the interface 17

(ACT 12). When the test signal has not been received via the interface 17 (ACT 12: NO), the process returns to ACT 12. Additionally, the processor 19 may transmit to the host computer 18 a signal indicating that the processor 19 is waiting for the test signal via the interface 17 after determining that the test signal is not received yet.

When the test signal is received via the interface 17 (ACT 12: YES), the processor 19 dispenses the solution onto the test paper 40 from the droplet ejection device 2 in accordance with the test signal, captures the image of the test pattern p using the image capturing unit 50, and transmits, to the host computer 18, a signal indicating the image date of the test pattern p and the output file of the area S of each dot in the test pattern p.

The host computer 18 receives the signal, and then displays the image data of the test pattern p and the output file of the area S of the test pattern p on the display unit 18b or the like (ACT 13).

The processor 19 determines whether or not the discharging signal has been received via the interface 17 (ACT 14). When the discharging signal has not been received via the interface 17 (ACT 14: NO), the process returns to ACT 14.

When the discharging signal has been received via the interface 17 (ACT 14: YES), the processor 19 controls the droplet ejection device 2 to discharge the solution to the each well opening 300 of the microplate 4 in accordance with the discharging signal. When this operation is completed (ACT 15), the processor 19 ends the operations.

The discharging system 500 of the droplet dispensing apparatus 1 of the embodiment configured as described above includes the test paper placing stand 41, or more broadly a test paper placing region, on which the test paper 40 can be placed. The test paper 40 is discolored at a place at which the solution is attached. The processor 19 controls the droplet ejection device 2 so as to eject the droplets onto the test paper 40 on the test paper placing stand 41 before ejecting the solution to the microplate 4.

Therefore, the borderline between the test pattern p and the test object is clearly recognizable when dispensing the clear solution from the plurality of nozzles 110 of droplet ejection device 2 since the test paper 40 discolored at a place at which the solution is attached is secured onto the test paper placing stand 41. Consequently, the borderline between the test pattern p and the test paper/medium is distinct even when the clear solution is dropped from the plurality of nozzles 110 of droplet ejection device 2, thus it is possible to accurately measure the area, dot diameter D or dot circumference C in the test pattern p formed on the test paper 40. Accordingly, a clear solution can be calibrated. It is also possible to detect a discharge failure of nozzles 110 of the droplet ejection device 2 by performing a solution calibration before ejecting the droplets to the microplate 4. When a non-discharging nozzle 110 is detected, it is possible to stop, for example, a dose response experiment or the like. Consequently, it contributes to suppression of a waste of the solution and early finding of deviation in the final evaluation results, incorrect evaluation of the medicine performance, or the like. Accordingly, it is possible to provide the droplet dispensing apparatus 1 capable of preventing the incorrect evaluation of tested solutions.

Second Embodiment

Figure 13:
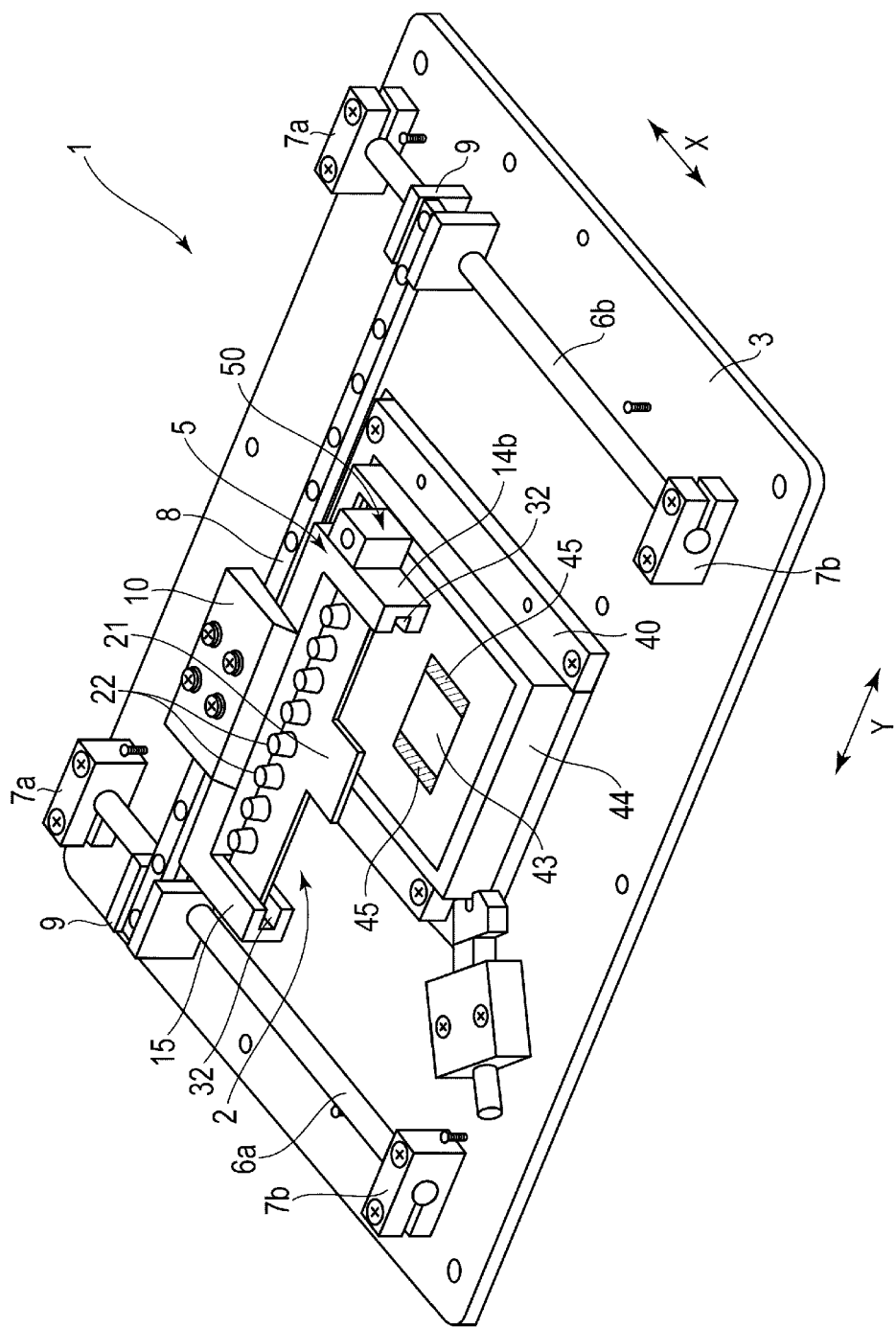
FIG. 13 illustrates a perspective view of a droplet dispensing apparatus according to a second embodiment.
Figure 14:
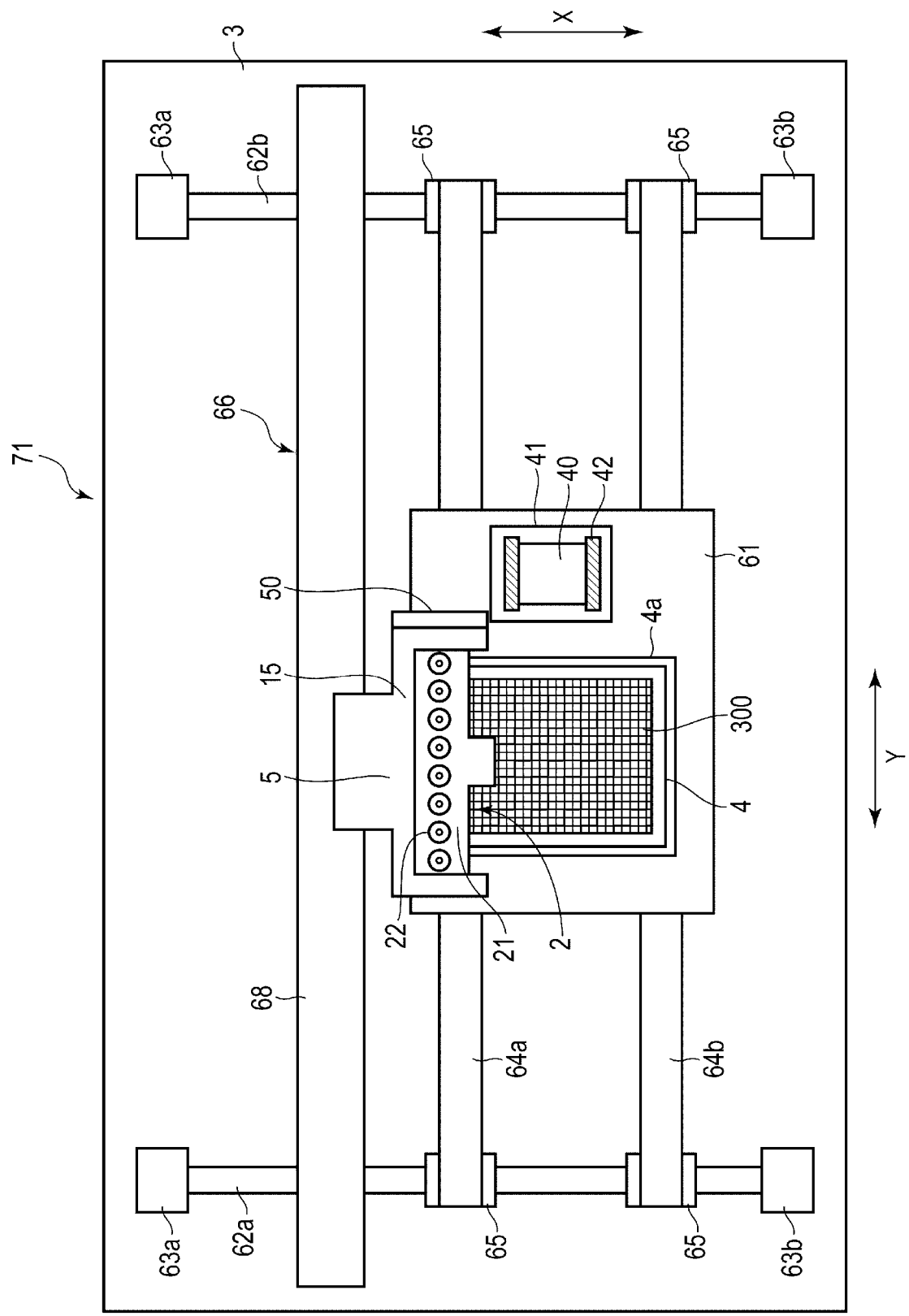
FIG. 14 illustrates a plan view of a droplet dispensing apparatus according to a third embodiment.

A droplet dispensing apparatus 1 according to a second embodiment will be described with reference to FIG. 13. The second embodiment is a modification of the first embodiment. In the first embodiment, the test paper placing stand 41 is provided next to the attachment member 4a of the microplate 4 as a region for placing the test paper 40. In the second embodiment, the microplate 4 is removed from the attachment member 4a. A test paper placing stand 44 having substantially the same external size as the microplate 4 is detachably attached to the attachment member 4a instead of the microplate 4. The test paper placing stand 44 has the same height as the microplate 4. Accordingly, the test paper placing stand 44 is fixed to the attachment member 4a in a region where the microplate 4 is fixed. The test paper placing stand 44 includes test paper holding members 45 for holding a test paper 43. The other parts have the same configurations as those in the first embodiment. In FIG. 13, the same parts as those in FIGS. 1 to 12 are denoted by the same reference numerals, and descriptions thereof are omitted.

The test paper placing stand 44 having substantially the same external size as the microplate 4 is detachably attached to the attachment member 4a at the same place as the microplate 4 in the second embodiment. The test paper 43 is held by the test paper holding members 45 on the test paper placing stand 44.

In the second embodiment, since the height of the test paper placing stand 44 is substantially the same as the height of the microplate 4, it is unnecessary to change from the height at which the droplet ejection device 2 drops the solution droplets into the well opening 300 of the microplate 4 to the height at which the droplet ejection device 2 drops the solution droplets onto the test paper 43 on the test paper placing stand 44, and vice versa.

The test paper 43 is held by the test paper holding members 45 onto the test paper placing stand 44. Subsequently, the droplet ejection device 2 moves the solution holding vessel 22 for dropwise operation to a predetermined position on the test paper 43 held on the test paper placing stand 44. For example, when the solution holding vessel 22-1 at a right end in FIG. 2 is filled with the solution, the solution holding vessel 22-1 is moved to the predetermined position on the test paper 43 secured onto the test paper placing stand 44. One or more droplets are dropped onto the test paper 43 from the nine nozzles 110 of the solution discharging array 27 communicating with the solution holding vessel 22-1. As a result, the test pattern p is formed on the test paper 43.

The image capturing unit 50 of the mounting module 5 is moved to a position corresponding to the test paper 43. The image capturing unit 50 captures the test patterns p1 to p9 on the test paper 43. The image data of the captured test patterns p1 to p9 is transmitted to the host computer 18. The host computer 18 receives the signal and displays the image data of the test pattern p and the output file of the area of the test pattern p on the display unit 18b or the like.

The operator calibrates the solution using the data of the dot area S displayed on the display unit 18b and the correlation table created in advance. At this time, a discharge amount of the single droplet from each nozzle 110 of the solution discharging array 27, forming the pattern p, and a dispensed amount of the total solution ejected from the nine nozzles 110 in a single discharging operation are calculated.

When the discharge failure is not detected in which a part of the plurality of the nozzles 110 of the droplet ejection device 2 does not discharge the solution by performing the solution calibration, the droplets are dropped in a predetermined amount from the droplet ejection device 2 to each well opening of the microplate 4.

At this time, the test paper placing stand 44 is removed from the attachment member 4a, and the microplate 4 is attached to the attachment member 4a instead of the test paper placing stand 44. The droplets are dropped in a predetermined amount from the droplet ejection device 2 into each well opening of the microplate 4 in a state where the solution is filled in the droplet ejection device 2, in the same manner as in the first embodiment.

The droplet dispensing apparatus 1 according to the second embodiment also includes the test paper placing stand 44 for placing the test paper 43 that is discolored at a place to which the solution is attached. Accordingly, it is possible to detect discharge failure in which a part of the plurality of the nozzles 110 does not discharge the solution even when the clear solution is dropped from the plurality of the nozzles 110. When the non-discharging nozzle 110 is detected, it is possible to stop, for example, the dose response experiment or the like. Consequently, it contributes to suppression of waste of the solution and early finding of deviation in the final evaluation results, incorrect evaluation of the medicine performance, or the like. Therefore, it is possible to prevent deviation in the final evaluation results or incorrect evaluation of the medicine performance.

Furthermore, a region for fixing the microplate 4 is also used as a region (placing region) for fixing the test paper placing stand 44 in the second embodiment. Consequently, it is advantageous that the droplet dispensing apparatus 1 can be downsized as compared with a case where the placing region of the test paper 40, i.e., the region in which the test paper placing stand 41 is disposed, is defined separately from the region for fixing the microplate 4, as in the first embodiment.

The microplate 4 or the test paper placing stand 44 is detachably provided on the attachment member 4a in the second embodiment. Alternatively, the test paper 40 may be placed on the microplate 4 attached to the attachment member 4a.

Third Embodiment

A droplet dispensing apparatus 71 according to a third embodiment will be described with reference with FIGS. 14 to 17. In the first embodiment, the droplet ejection device 2 and the image capturing unit 50, mounted on the mounting module 5, are moved while the test paper placing stand 41 for placing the test paper 40 is fixed. The droplet dispensing apparatus 71 according to the third embodiment is a modification of the first embodiment, in which the microplate 4 and the test paper placing stand 41 are moved while the droplet ejection device 2 and the image capturing unit 50 are fixed. In FIGS. 14 to 17, the same parts as those in FIGS. 1 to 12 are denoted by the same reference numerals, and descriptions thereof are omitted.

The microplate 4 and the test paper placing stand 41 are fixed to a flat Y-direction moving stage 61 in the third embodiment. The Y-direction moving stage 61 includes the frame-like attachment member 4a to detachably attach the microplate 4.

A pair of right and left X-direction guide rails 62a, 62b extend, on the base 3, in X-direction and provided at both sides of the base 3. Both ends (upper and lower ends in FIG. 14) of each of the X-direction guide rails 62a, 62b are fixed to fixing stands 63a, 63b, each of which protrudes from the base 3.

Two Y-direction guide rails 64a, 64b, each of which extends in Y-direction, are provided between the X-direction guide rails 62a, 62b. The two Y-direction guide rails 64a, 64b are arranged in parallel with an interval in X-direction. Both ends of each of the Y-direction guide rails 64a, 64b are respectively fixed to X-direction moving stands 65 slidable in X-direction along the X-direction guide rails 62a, 62b. The four X-direction moving stands 65 simultaneously slide.

A Y-direction moving stage 61 is fixed to the two Y-direction guide rails 64a, 64b. Accordingly, a movement in which the Y-direction moving stage 61 moves in Y-direction along the Y-direction guide rails 64a, 64b is combined with a movement in which the X-direction moving stand 65 moves in X-direction along the X-direction guide rails 62a, 62b, whereby the microplate 4 and the test paper placing stand 41 are movably supported at any position in X- and Y-directions perpendicular to each other.

Figure 15:
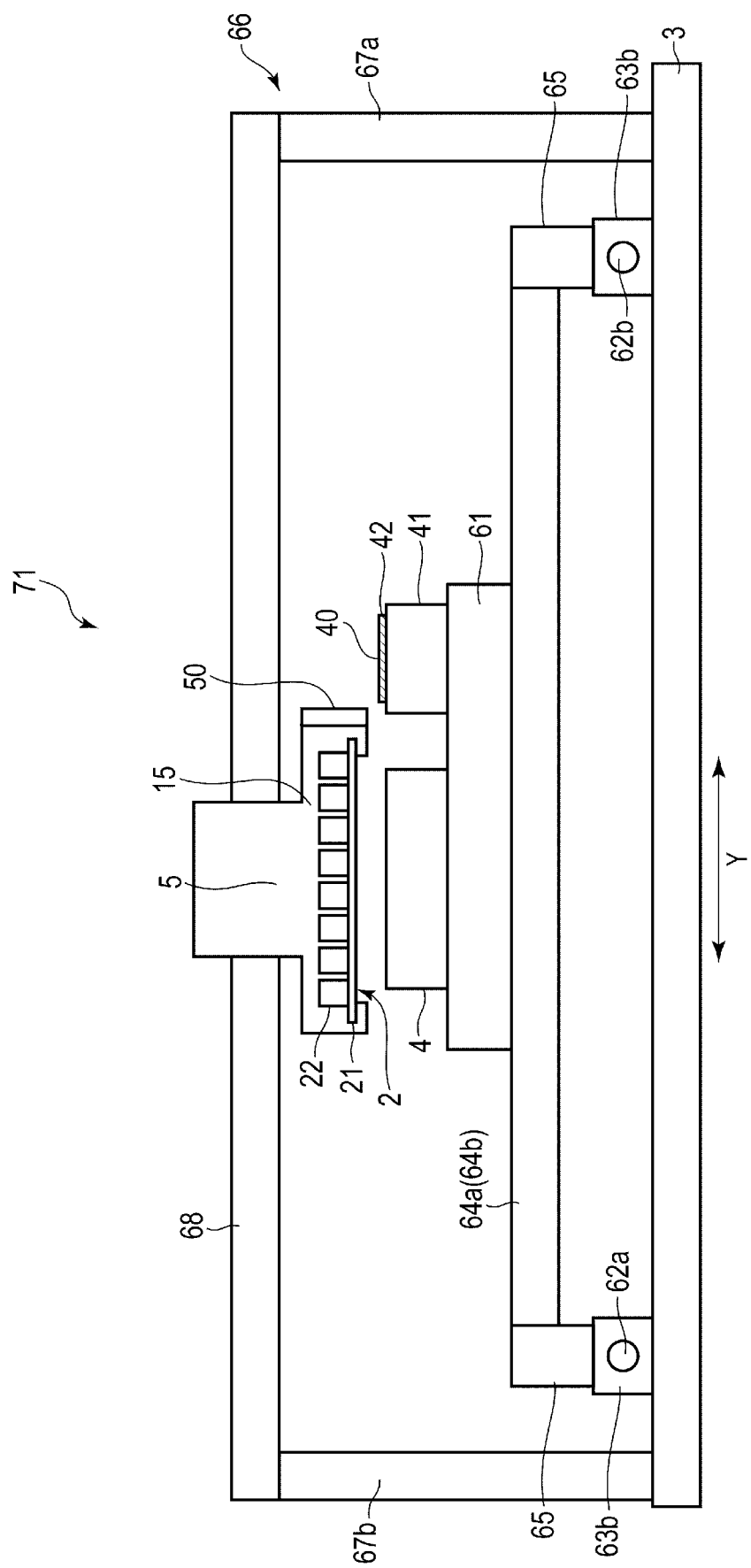
FIG. 15 illustrates a front side view of the droplet dispensing apparatus according to the third embodiment.
Figure 16:
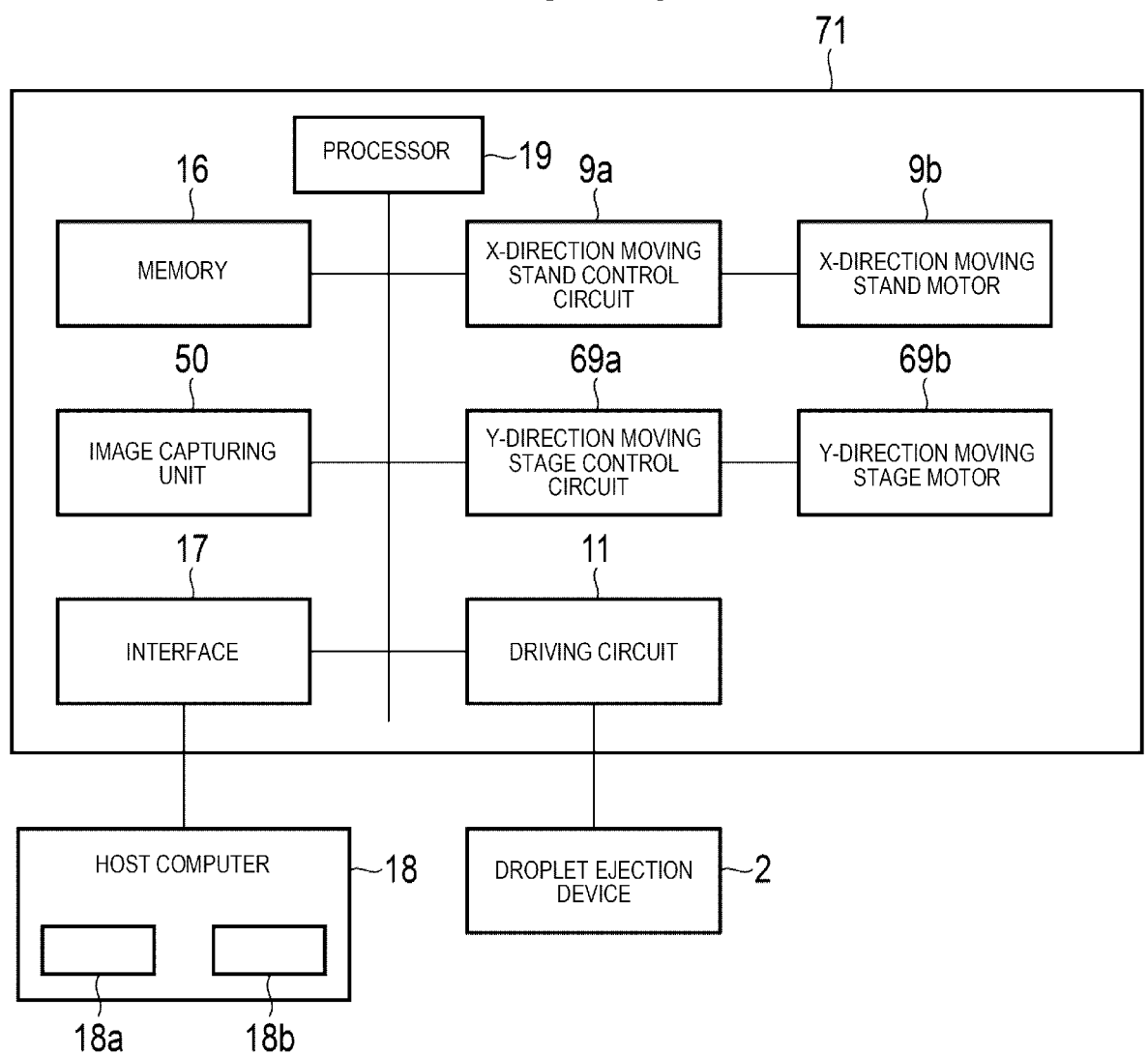
FIG. 16 is a block diagram illustrating a control system of a discharging system of a droplet ejection device according to the third embodiment.

A fixing mechanism 66 of the mounting module 5 for mounting the droplet ejection device 2 is provided on the base 3 at a position not interfering with a movement range of the Y-direction moving stage 61. The fixing mechanism 66 includes two support posts 67a, 67b, and one lateral frame 68 extending in Y-direction, as shown in FIG. 15. The two support posts 67a, 67b stand vertically on both ends of the base 3 in Y-direction. The lateral frame 68 is built between upper ends of the two support posts 67a, 67b. The mounting module 5 is fixed to a substantially center position of the lateral frame 68. The droplet ejection device 2 is fixed to the mounting module 5. Furthermore, the image capturing unit 50 is mounted on a part of the module body 15, which is the attachment section of the droplet ejection device 2, in the mounting module 5. In FIG. 16, reference number 69a denotes a Y-direction moving stage control circuit for controlling a movement of the Y-direction moving stage 61, and reference number 69b denotes a Y-direction moving stage motor for driving the Y-direction moving stage 61.

Detailed operations of the droplet dispensing apparatus 71 configured as described above will be described below. The droplet ejection device 2 is mounted on the mounting module 5. The test paper 40 is held on the test paper placing stand 41 by the test paper holding members 42.

The solution is supplied in a predetermined amount from the upper opening 22b of the solution holding vessel 22 of the droplet ejection device 2 using a pipetter or the like. The solution is held on an inner surface of the solution holding vessel 22. The opening 22a at the bottom of the solution holding vessel 22 communicates with the solution discharging array 27. The solution held by the solution holding vessel 22 is filled into each of the pressure chambers 210 of the solution discharging array 27 via the opening 22a on the bottom surface of the solution holding vessel 22.

When the droplet ejection device 2 is filled with the solution, the Y-direction moving stage 61 is moved. At this time, the Y-direction moving stage 61 moves the test paper 40 held on the test paper placing stand 41 to a position directly below the solution holding vessel 22 corresponding to a portion where the droplets are dropped from the droplet ejection device 2. For example, when the droplets are dropped from the solution holding vessel 22-1 at the right end in FIG. 2, the test paper 40 held on the test paper placing stand 41 is moves to a position directly below the solution holding vessel 22-1.

A voltage control signal is input to the control signal input terminal 25 of the electrical board wiring 24. The voltage control signal is input to the driving element 130 from the electrode terminal connecting portion 26 of the electrical board wiring 24. The diaphragm 120 is deformed in response to the application of the voltage control signal to the driving element 130, thereby changing a volume of the pressure chamber 210. Accordingly, the solution is discharged as solution droplets from the nozzle 110 of the solution discharging array 27.

The test pattern p is formed on the test paper 40 by dispensing one or more droplets to the test paper 40 from each of the nine nozzles 110 of the solution discharging array 27 communicating with the solution holding vessel 22 corresponding to a portion where the droplet is dropped from the droplet ejection device 2.

The Y-direction moving stage 61 is moved to a position where the test pattern p on the test paper 40 is accommodated within a capturing range of the image capturing unit 50 so that an image of the test pattern p is captured. The image data of the captured test pattern p is transmitted to the host computer 18. The host computer 18 receives the signal and displays the image data of the test pattern p and the output file of the area of the test pattern p on the display unit 18b or the like.

The operator can calibrate the solution using the data of the dot area S displayed on the display unit 18b and the correlation table created in advance. At this time, a discharge amount of the single droplet from each nozzle 110 of the solution discharging array 27, forming the pattern p, and a dispensed amount of the total solution ejected from the nine nozzles 110 in a single discharging operation are calculated.

The droplet dispensing apparatus 71 according the third embodiment also includes the test paper placing stand 41 for securing the test paper 40 that is discolored at a place to which the solution is attached. Accordingly, the borderline between the test pattern p and the test object is clearly recognizable even when dispensing a clear solution from the plurality of nozzles 110 of droplet ejection device.

Consequently, the borderline between the test pattern p and the test object is distinct even when a clear solution is dropped from the plurality of nozzles 110 of droplet ejection device 2, thus it is possible to accurately measure the area, dot diameter D or dot circumference C of the test pattern p formed on the test paper 40. It is possible to detect discharge failure in which a part of the plurality of the nozzles 110 of the droplet ejection device 2 does not discharge the solution by performing the solution calibration before ejecting the droplets to the microplate 4. When the non-discharging nozzle 110 is detected, it is possible to stop, for example, the dose response experiment or the like. Consequently, it contributes to suppression of waste of the solution and early finding of deviation in the final evaluation results, incorrect evaluation of the medicine performance, or the like. Accordingly, it is possible to prevent the incorrect evaluation when dispensing a clear solution onto the microplate 4.

The droplets are dispensed in a predetermined amount into each well opening of the microplate 4 from the droplet ejection device 2 when the discharge failure is not detected in which a part of the plurality of the nozzles 110 of the droplet ejection device 2 does not discharge the solution by performing the solution calibration.

At this time, the microplate 4 is moved by the Y-direction moving stage 61 in a state where the solution is filled in the droplet ejection device 2. The microplate 4 is moved to a position directly below the solution holding vessel 22 corresponding to a portion where the droplet is to be dispensed from the droplet ejection device 2. The droplets are dispensed in a predetermined amount from the droplet ejection device 2 to each well opening of the microplate 4 in the same manner as in the first embodiment.

Fourth Embodiment

Figure 17:
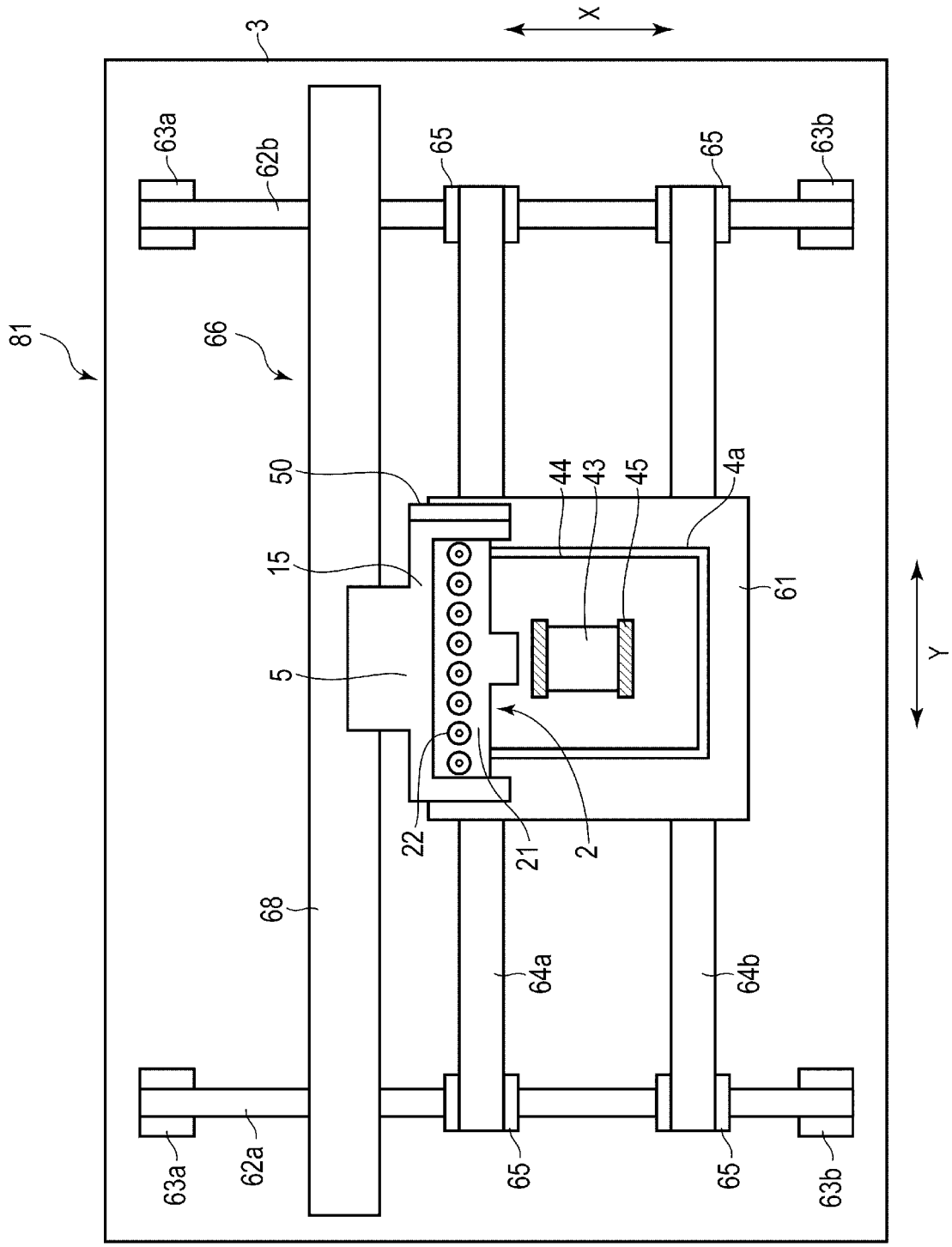
FIG. 17 illustrates a plan view of a droplet dispensing apparatus according to a fourth embodiment.

A droplet dispensing apparatus 81 according to a fourth embodiment will be described with reference with FIG. 17. The droplet dispensing apparatus 81 according to the fourth embodiment is a modification of the droplet dispensing apparatus 71 according to the third embodiment. In the third embodiment, the test paper placing stand 41 is provided next to the attachment member 4a of the microplate 4 on the Y-direction moving stage 61. In the fourth embodiment, the microplate 4 is removed from the attachment member 4a. A test paper placing stand 44 having substantially the same external size as the microplate 4 is detachably attached to the attachment member 4a instead of the microplate 4. The test paper placing stand 44 has the same height as the microplate 4. Accordingly, the test paper placing stand 44 is fixed to the attachment member 4a in a region where the microplate 4 is fixed. The test paper placing stand 44 includes test paper holding members 45 for holding a test paper 43. The other parts have the same configurations as those in the third embodiment.

In the fourth embodiment, the test paper placing stand 44 having substantially the same external size as the microplate 4 is detachably attached to the attachment member 4a at the same place as the microplate 4 in the third embodiment. The test paper 43 is held by the test paper holding members 45 on the test paper placing stand 44. The droplets are dropped in a predetermined amount from the droplet ejection device 2 to the test paper 43 held on the test paper placing stand 44 in the same manner as in the third embodiment.

The droplet dispensing apparatus 81 according to the fourth embodiment is configured such that the test paper 43 that is discolored at a place to which the solution is attached can be held on the test paper placing stand 44. Accordingly, the borderline between the test pattern p and the test object is clearly recognizable even when dispensing a clear solution from the plurality of nozzles 110 of droplet ejection device 2. Consequently, the borderline between the test pattern p and the test object is distinct even when a clear solution is dropped from the plurality of nozzles 110 of droplet ejection device 2, thus it is possible to accurately measure the area, dot diameter D or dot circumference C of the test pattern p formed on the test paper 43. It is possible to detect discharge failure in which a part of the plurality of the nozzles 110 of the droplet ejection device 2 does not discharge the solution by performing the solution calibration before ejecting the droplets to the microplate 4. When the non-discharging nozzle 110 is detected, it is possible to stop, for example, the dose response experiment or the like. Consequently, it contributes to suppression of waste of the solution and early finding of deviation in the final evaluation results, incorrect evaluation of the medicine performance, or the like. Accordingly, it is possible to prevent the incorrect evaluation of the dispensing of a clear solution onto the microplate 4.

In the fourth embodiment, since the height of the test paper placing stand 44 is substantially the same as the height of the microplate 4, it is unnecessary to change from the height at which the droplet ejection device 2 drops the solution droplets into the well opening 300 of the microplate 4 to the height at which the droplet ejection device 2 drops the solution droplets onto the test paper 43 on the test paper placing stand 44, and vice versa.

The droplets are dropped in a predetermined amount into each well opening of the microplate 4 from the droplet ejection device 2 when the discharge failure is not detected in which a part of the plurality of the nozzles 110 of the droplet ejection device 2 does not discharge the solution by performing the solution calibration.

At this time, the test paper placing stand 44 is removed from the attachment member 4a, and the microplate 4 is attached to the attachment member 4a instead of the test paper placing stand 44. The microplate 4 is moved by the Y-direction moving stage 61 in a state where the solution is filled in the droplet ejection device 2. The microplate 4 is moved to a position directly below the solution holding vessel 22 corresponding to a portion where the droplet is dropped from the droplet ejection device 2. The droplets are dropped in a predetermined amount from the droplet ejection device 2 to each well opening of the microplate 4 in the same manner as in the first embodiment.

The droplet dispensing apparatus 81 according to the fourth embodiment also includes the test paper placing stand 44 for placing the test paper 43 that is discolored at a place to which the solution is attached. Accordingly, it is possible to detect discharge failure in which some of the nozzles 110 do not discharge the solution even if a clear solution is dispensed from the nozzles 110. When a non-discharging nozzle 110 is detected, it is possible to stop, for example, the dose response experiment or the like. Consequently, this contributes to suppression of waste of the solution and early finding of deviation in the final evaluation results, incorrect evaluation of the medicine performance, or the like. Therefore, it is possible to provide the droplet dispensing apparatus 81 capable of preventing deviation in the final evaluation results or incorrect evaluation of the medicine performance.

A region for fixing the microplate 4 is also used as a placing region for fixing the test paper placing stand 44 in the fourth embodiment. Consequently, it is advantageous in that the droplet dispensing apparatus 81 can be downsized as compared with a case in which the placing region for the test paper 40, is separately provided from the region for fixing the microplate 4, such as with the test paper placing stand 41 in the third embodiment.

The driving element 130 as the driving unit is in an annular shape in the embodiments stated above, however, a shape of the driving unit is not limited thereto. The driving unit may be, for example, in a rhomboid or an ellipse shape. A shape of the pressure chamber 210 is also not limited to an annular shape, but may be in a rhomboid shape, an ellipse shape, a rectangular shape or the like.

A nozzle 110 is arranged at a center of the driving element 130 in the embodiments, but a position of the nozzle 110 is not limited as long as the nozzle 110 can discharge the solution from the pressure chamber 210. For example, the nozzle 110 may be formed outside the driving element 130, instead of within the driving element 130.

The actuator 170 includes the driving element 130 having the diaphragm 120 and the piezoelectric film, and discharges the solution by a piezoelectric method. However, the actuator 170 is not limited to a specific configuration. For example, the actuator 170 may consist of a thin film heat transfer heater and may discharge the solution by a thermal jet method.

It is possible to provide a droplet dispensing apparatus capable of preventing the incorrect evaluation of the dispensing of a clear solution according to the example embodiments described above.

While certain embodiments have been described, these embodiments have been presented by way of example only, and are not intended to limit the scope of the present disclosure. Indeed, the novel embodiments described herein may be embodied in a variety of other forms; furthermore, various omissions, substitutions, and changes in the form of the embodiments described herein may be made without departing from the spirit of the present disclosure. The accompanying claims and their equivalents are intended to cover such forms or modifications as would fall within the scope and spirit of the present disclosure.

What is claimed is:

1. A method for testing a droplet ejection property of a droplet ejection device, the method comprising:
    setting a test sheet for testing a droplet ejection property of the droplet ejection device at a height above a base substantially matching a height of a microplate when disposed on the base;
    positioning the droplet ejection device at a position above the test sheet;
    ejecting droplets from an array of nozzles of the droplet ejection device onto the test sheet to form test patterns on the test sheet;
    capturing image of the test sheet after ejecting the droplets;
    performing image processing on image data generated from the captured image of the test sheet to determine a size of each of the test patterns; and
    generating a data file including the determined size of each of the test patterns, wherein
    the test sheet has a receptive layer for receiving a droplet and becomes colored or discolored at a place where a light-transmissive droplet is received.

2. The method according to claim 1, wherein the test sheet is set on a stationary sheet stand disposed adjacent to a stationary microplate holder for holding the microplate, and the droplet ejection device is moved to the position above the test sheet.

3. The method according to claim 1, wherein setting the test sheet comprises:
    setting the test sheet on an upper surface of a sheet stand placed on the base adjacent to a microplate holder on the base.

4. The method according to claim 1, wherein positioning the droplet ejection device at the position above the test sheet comprises moving a stage on which a test stand for holding the test sheet is disposed to a position below the droplet ejection device.

5. The method according to claim 1, wherein setting the test sheet comprises:
    setting the test sheet on an upper surface of a sheet stand disposed on a stage on an upper surface of the base, the stage being moveable in a horizontal direction parallel to the upper surface of the base.

6. The method according to claim 1, further comprising:
    displaying a user interface including the determined size of each of the test patterns.

* * * * *